United States Patent
Thompson et al.

(10) Patent No.: US 8,864,416 B2
(45) Date of Patent: *Oct. 21, 2014

(54) SEISMIC CABLE WITH ADJUSTABLE BUOYANCY

(71) Applicant: Fairfield Industries Incorporated, Sugar Land, TX (US)

(72) Inventors: James N. Thompson, Sugar Land, TX (US); Etienne Marc, Houston, TX (US)

(73) Assignee: Fairfield Industries Incorporated, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,205

(22) Filed: Jul. 26, 2013

(65) Prior Publication Data

US 2013/0308421 A1   Nov. 21, 2013

Related U.S. Application Data

(60) Division of application No. 13/538,944, filed on Jun. 29, 2012, now Pat. No. 8,496,407, and a continuation of application No. 12/203,803, filed on Sep. 3, 2008, now Pat. No. 8,226,328.

(51) Int. Cl.
  *G01V 1/28*   (2006.01)
  *G01V 1/20*   (2006.01)
  *G01V 1/38*   (2006.01)

(52) U.S. Cl.
  CPC .............. *G01V 1/3852* (2013.01); *G01V 1/201* (2013.01)
  USPC .............. 405/166; 405/169; 405/170; 367/15

(58) Field of Classification Search
  USPC .............. 405/158, 166, 167, 168.3, 169, 170
  See application file for complete search history.

(56) References Cited

U.S. PATENT DOCUMENTS

| | | | |
|---|---|---|---|
| 3,530,211 A | 9/1970 | Uhlig et al. | |
| 4,533,789 A | 8/1985 | Katz | |
| 4,765,711 A * | 8/1988 | Obst | 385/103 |
| 4,778,306 A * | 10/1988 | Anselmi et al. | 405/171 |
| 4,870,625 A | 9/1989 | Young et al. | |
| 4,920,680 A | 5/1990 | Lindgren | |
| 5,035,660 A | 7/1991 | Werner | |
| 5,189,642 A | 2/1993 | Donoho et al. | |
| 5,471,436 A | 11/1995 | Harvey | |

(Continued)

OTHER PUBLICATIONS

International Search Report and Written Opinion of the International Searching Authority mailed Apr. 12, 2010 in PCT/US2009/055598.

*Primary Examiner* — Benjamin Fiorello
(74) *Attorney, Agent, or Firm* — Patterson & Sheridan, L.L.P.

(57) ABSTRACT

A method for performing a seismic survey in a water column includes providing a length of flexible cable from a cable storage device disposed on a vessel to a cable handling device adjacent the cable storage device. The flexible cable comprises a specific gravity that is greater than a specific gravity of water in the water column. The method further comprises routing the flexible cable to pass adjacent a workstation disposed on the vessel, deploying a free end of the flexible cable into the water column, attaching at least one of a plurality of seismic sensor units to the cable as the cable passes the workstation, and controlling the motion of the vessel and the rotational speed of the cable handling device to allow the flexible cable to rest on the bottom of the water column.

14 Claims, 14 Drawing Sheets

(56) References Cited

U.S. PATENT DOCUMENTS

| | | | |
|---|---|---|---|
| 5,623,455 A | 4/1997 | Norris | |
| 5,724,241 A | 3/1998 | Wood et al. | |
| 6,024,344 A | 2/2000 | Buckley et al. | |
| 6,349,161 B1 | 2/2002 | Gleason et al. | |
| 6,424,768 B1 | 7/2002 | Booth et al. | |
| 7,061,829 B2 | 6/2006 | Scott | |
| 7,224,872 B2 | 5/2007 | Goldner et al. | |
| 7,310,287 B2 | 12/2007 | Ray et al. | |
| 7,933,165 B2 | 4/2011 | Thompson et al. | |
| 8,087,848 B2 * | 1/2012 | Thompson et al. | 405/166 |
| 8,226,328 B2 * | 7/2012 | Thompson et al. | 405/166 |
| 8,496,407 B2 * | 7/2013 | Thompson et al. | 405/166 |
| 2002/0062778 A1 | 5/2002 | Barker | |
| 2003/0157826 A1 | 8/2003 | Moreno et al. | |
| 2005/0016769 A1 | 1/2005 | Wallace | |
| 2005/0051226 A1 | 3/2005 | D'Amico | |
| 2005/0052951 A1 * | 3/2005 | Ray et al. | 367/188 |
| 2006/0209633 A1 | 9/2006 | George et al. | |
| 2007/0054563 A1 | 3/2007 | Stagi et al. | |
| 2007/0175651 A1 | 8/2007 | Jonscher et al. | |
| 2007/0237575 A1 | 10/2007 | Dilno et al. | |
| 2007/0243759 A1 | 10/2007 | Rodrigues et al. | |
| 2008/0056066 A1 | 3/2008 | George et al. | |

\* cited by examiner

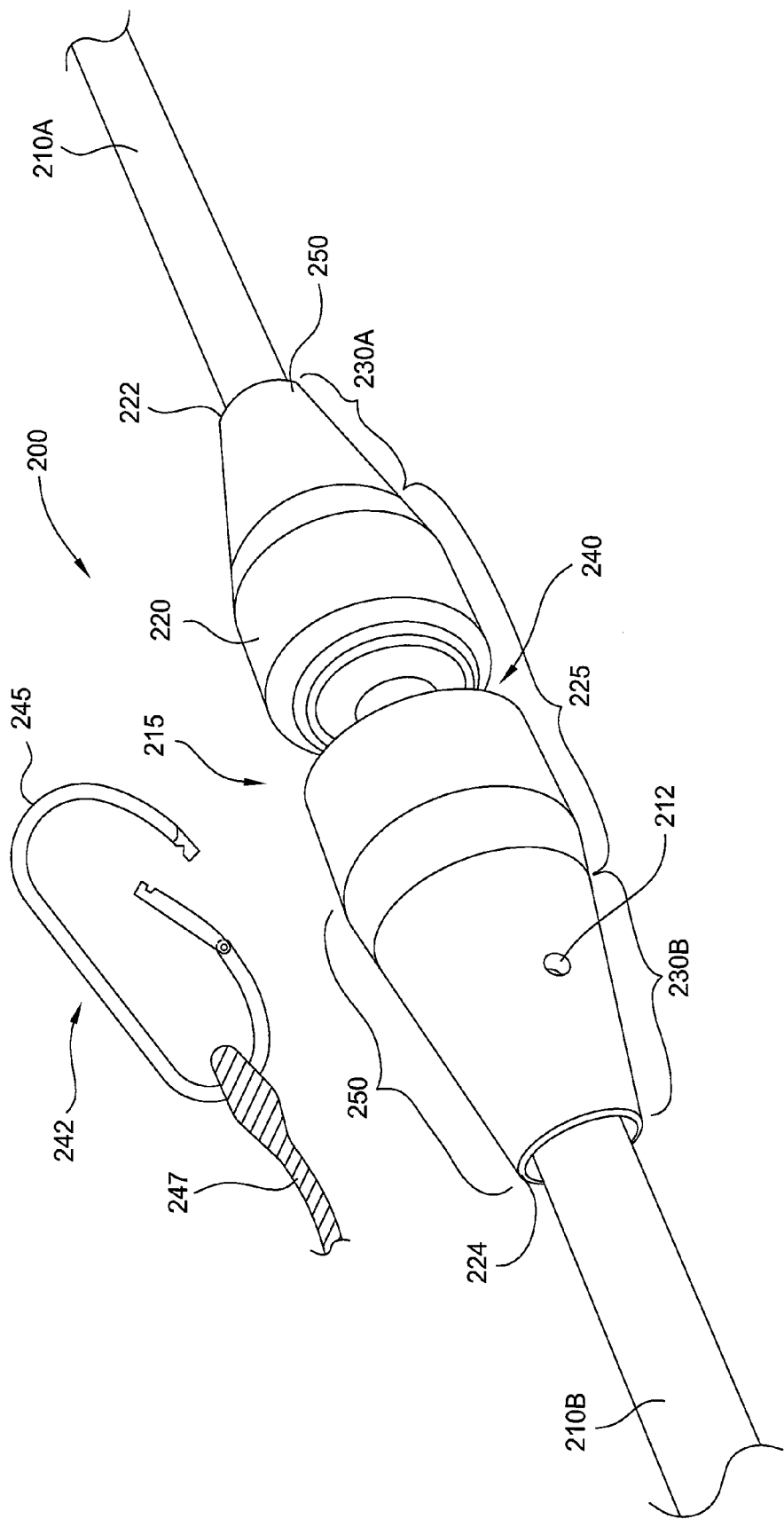

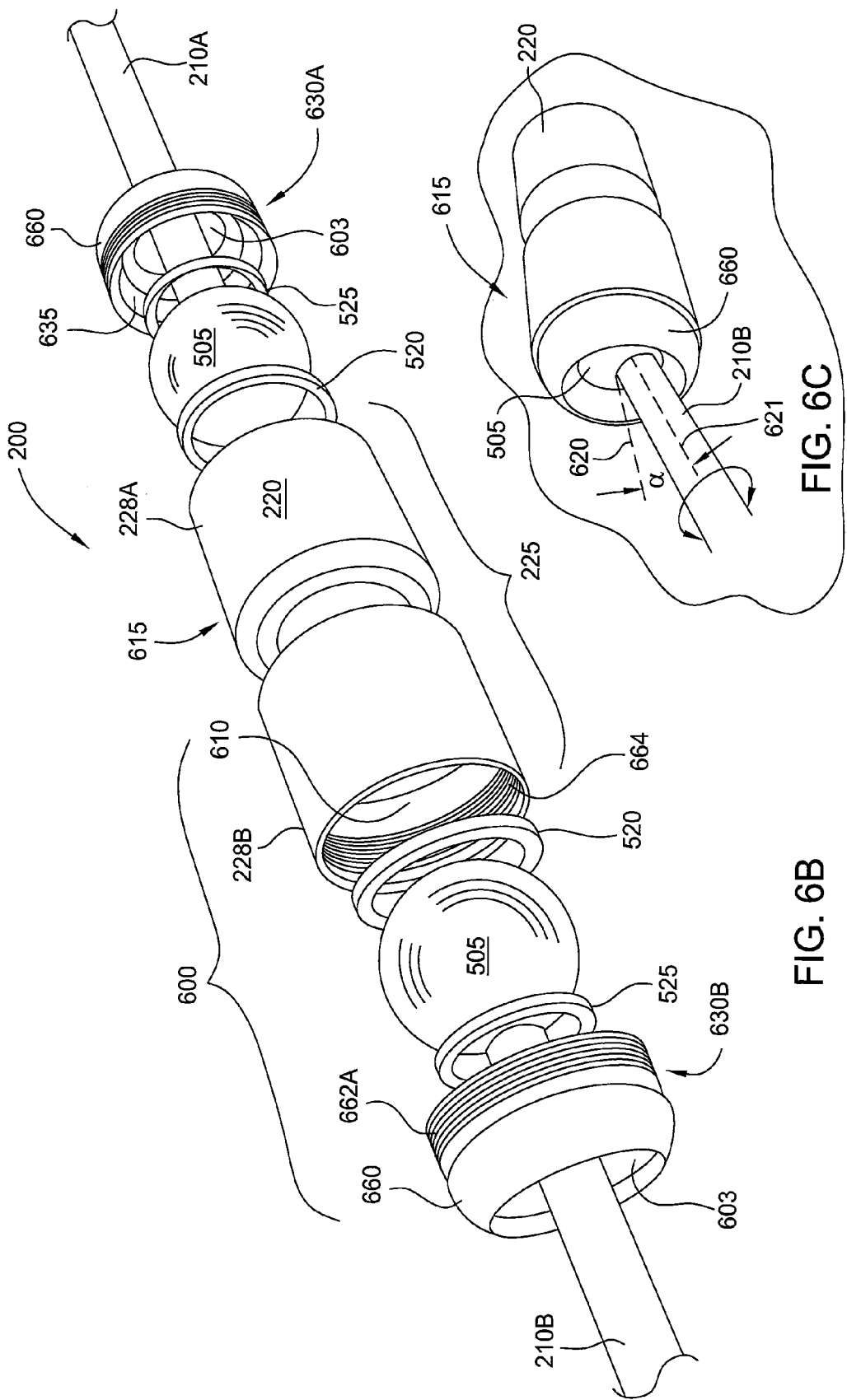

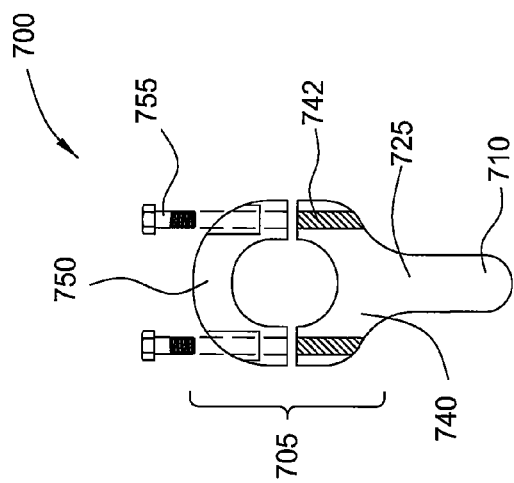
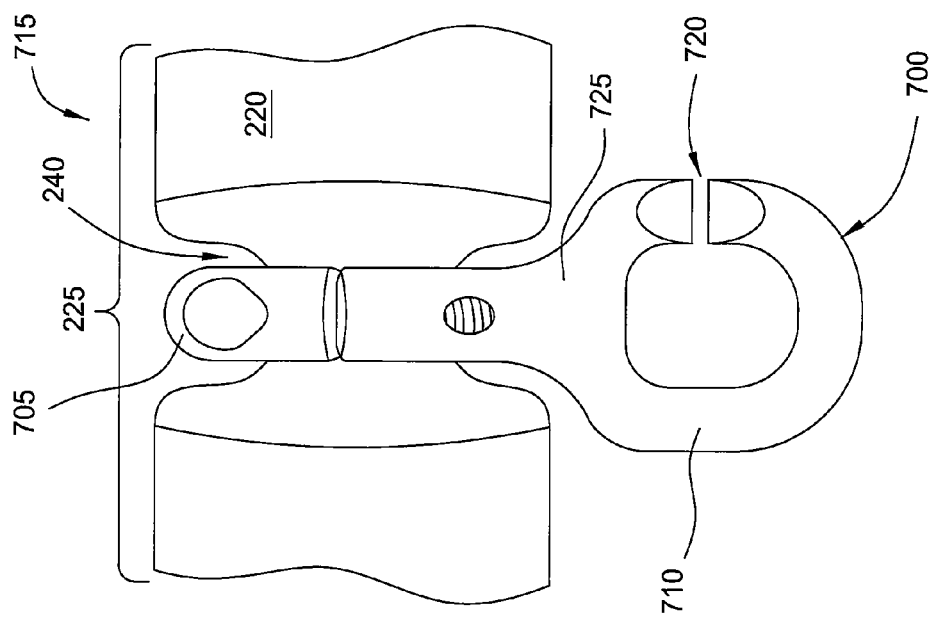
FIG. 7C
FIG. 7B

SEISMIC CABLE WITH ADJUSTABLE BUOYANCY

CROSS-REFERENCE TO RELATED APPLICATIONS

This application is a divisional of U.S. patent application Ser. No. 13/538,944, filed Jun. 29, 2012, which is a continuation of U.S. patent application Ser. No. 12/203,803, filed Sep. 3, 2008, which issued as U.S. Pat. No. 8,226,328 on Jul. 24, 2012, each of the aforementioned applications are hereby incorporated by reference herein.

BACKGROUND OF THE INVENTION

1. Field of the Invention

Embodiments described herein relate to methods and apparatus for a seismic cable.

2. Description of the Related Art

Seismic exploration operations generally utilize a seismic energy source to generate an acoustic signal that propagates into the earth. The acoustic signal is partially reflected by subsurface seismic reflectors in the earth, which may include interfaces between subsurface lithologic or fluid layers that may be characterized by different elastic properties. The reflected signals are detected and recorded by seismic receiver units located at or near the surface of the earth, thereby generating a seismic survey of the subsurface environment. The recorded signals, or seismic energy data, can then be processed to yield information relating to the lithologic subsurface formations, identifying such features, as, for example, lithologic subsurface formation boundaries.

Generally, the method for detection and recording of seismic signals is similar on land and in marine environments; however, marine environments present unique challenges presented by the body of water overlying the earth's surface. Seismic exploration operations in marine environments are typically conducted from the deck of one or more seismic exploration vessels, such as floating platforms or ships. The seismic exploration vessels typically provide storage and transportation for a plurality of seismic receiver units and associated operational equipment. Seismic exploration in deep water typically uses seismic sensor units deployed from the deck of the seismic exploration vessel to be placed on or near the bottom of a body of water. These seismic sensor units are part of systems typically referred to as Ocean Bottom Cabling (OBC) or Ocean Bottom Seismometer (OBS) systems, wherein data from a seismic survey may be received.

FIG. 1A is a schematic side view of a deployment operation from a vessel 5 using a cable 1 as known in the art. In the deployment operation, the cable 1 is paid out over a backdeck 10 of the vessel 5 from a spool, sheave or pulley, powered or otherwise, such as a cable handling device 15. The cable 1 includes a plurality of connectors 20 that must pass through at least a portion of the cable handler 15. Seismic sensor units 25 are coupled to the connectors 20 as the cable 1 passes over the backdeck 10 by personnel onboard the vessel. In the deployment operation, the seismic sensor units 25 are coupled to the connectors 20 by a lanyard 30, which may be a length of flexible rope, cable, or chain. The cable 1 with seismic sensor units 25 coupled thereto form a mainline cable that falls to rest on or near a bottom 40 of a body of water 35 to form at least a portion of a seismic array. The mainline cable may be many miles long and have over 200 seismic sensor units 25 attached to the cable 1 at predetermined intervals. After one or more mainline cables are positioned on the bottom 40 to define the array along the bottom 40, the seismic survey is performed.

FIG. 1B is a perspective view of a portion of a seismic cable 1 prior to coupling with the seismic sensor units 25 of FIG. 1A. Each of the connectors 20 typically include a body 45 that is larger than the diameter of the cable 1, and is configured to clamp or fasten to an outer surface of the cable 1. In some applications, the connectors 20 may be made of or include a metallic material, which may create noise during the seismic survey. In other applications, the body 45 includes ring-like or hook-like members 50 to facilitate quick connection and disconnection of the seismic sensor units. The cable 1 may also include a plurality of discrete cable coupling devices 55 configured to connect ends of cable sections to increase the overall length of the cable 1. After the seismic survey, the cable 1 and seismic sensor units are retrieved. During retrieval, the cable 1 is spooled or routed through a winch, reel or sheave, a pinch roller powered or otherwise, for example, the cable handler 15 of FIG. 1A, which pulls the cable 1 and seismic sensor units from the water. As the cable 1 passes over the deck of the vessel, the seismic sensor units 25 are detached from the cable 1 and the cable 1 and seismic sensor units are stowed.

As the seismic cable 1 shown in FIGS. 1A and 1B may be routed through a cable handler during deployment and/or retrieval, the connectors 20 and/or cable coupling devices 55 pose a risk of snagging, binding, or tangling the cable 1. In some cases, the ring-like or hook-like members 50 protrude from the periphery of the body 45, which may snag, bind, or tangle the cable. Further, the ring-like or hook-like members 55 create the risk of injury to personnel that may be in the vicinity of the cable, such as during a seismic sensor unit coupling and decoupling procedure.

Another challenge when using the cable 1 lies in the accurate placement of seismic sensor units 25 on the bottom 40 during deployment. The seismic survey typically entails advanced planning of the area of the bottom 40 to be explored, and placing the array typically requires accurate placement of the seismic sensor units 25 on the bottom 40 according to the plan. The seismic sensor unit placement may be challenged as the cable 1 is typically buoyant in seawater. The buoyancy of the cable 1 makes the sections between the connectors 20 vulnerable to currents and/or hydrodynamic forces, which may alter the fall or cause a drift of the mainline cable. The altered fall path may cause one or more seismic sensor units 25 to drift from the intended locational placement on the bottom 40.

Therefore, a need exists for an improved seismic cable.

SUMMARY OF THE INVENTION

A method and apparatus for a seismic cable is described. In one embodiment, a method for performing a seismic survey in a water column is described. The method comprises providing a length of flexible cable from a cable storage device disposed on a vessel to a cable handling device adjacent the cable storage device. The flexible cable comprises a specific gravity that is greater than a specific gravity of water in the water column. The method further comprises routing the flexible cable to pass adjacent a workstation disposed on the vessel, deploying a free end of the flexible cable into the water column, attaching at least one of a plurality of seismic sensor units to the cable as the cable passes the workstation, and controlling the motion of the vessel and the rotational speed of the cable handling device to allow the flexible cable to rest on the bottom of the water column.

In another embodiment, a method for performing a seismic survey in a water column is described. The method comprises providing a first cable segment and a second cable segment comprising a flexible cable from a cable handling device disposed on the vessel, wherein the first cable segment and the second cable segment are coupled by a connector that prevents transmission of power and data signals between the first cable segment and the second cable segment. The method further comprises routing the flexible cable to pass adjacent a workstation disposed on the vessel, deploying a free end of the flexible cable into the water column, attaching at least one of a plurality of seismic sensor units to the cable as the cable passes the workstation, and controlling the motion of the vessel and the rotational speed of the cable handling device to allow the flexible cable to rest on the bottom of the water column.

In another embodiment, a method for performing a seismic survey in a water column is described. The method comprises providing a first cable segment and a second cable segment comprising a flexible cable from a cable handling device disposed on the vessel, wherein the first cable segment and the second cable segment are coupled by a connector that prevents transmission of power and data signals between the first cable segment and the second cable segment and the flexible cable has a specific gravity that is greater than a specific gravity of water in the water column. The method further comprises routing the flexible cable to pass adjacent a workstation disposed on the vessel, deploying a free end of the flexible cable into the water column, attaching at least one of a plurality of seismic sensor units to the cable as the cable passes the workstation, and controlling the motion of the vessel and the rotational speed of the cable handling device to allow the flexible cable to rest on the bottom of the water column.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is a perspective view of one embodiment of a cable connector coupling two cable segments.

FIG. 6B is an exploded perspective view of the cable connector shown in FIG. 6A.

FIG. 6C is a perspective view of the cable connector of FIGS. 6A and 6B showing articulations of a cable segment.

FIG. 7B is a side view of the connector shown in FIG. 7A.

FIG. 7C is a side view of one embodiment of a rotatable clamp.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
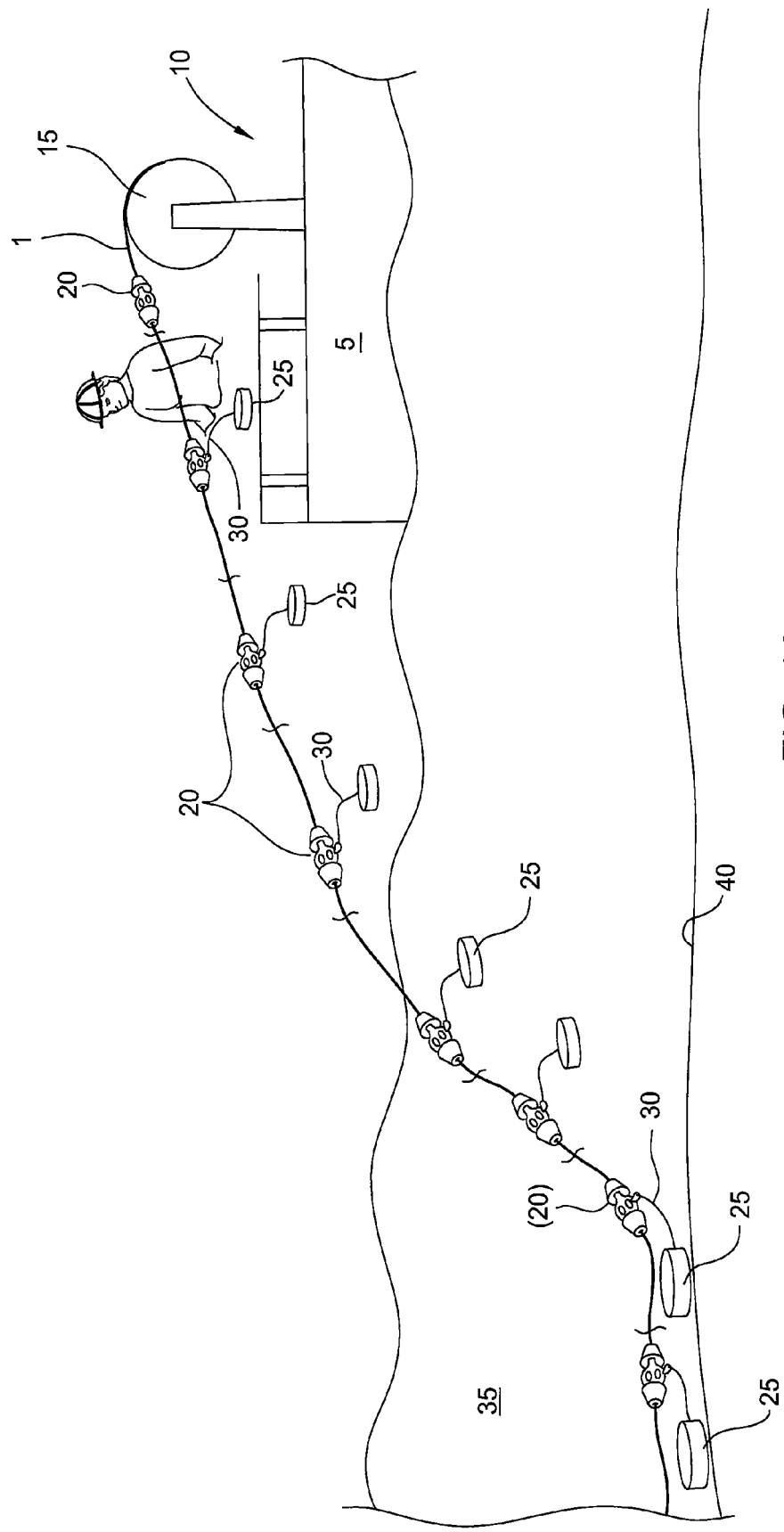
FIG. 1A (Prior Art) is a schematic side view of a deployment operation of a seismic cable from a marine vessel.
Figure 1B:
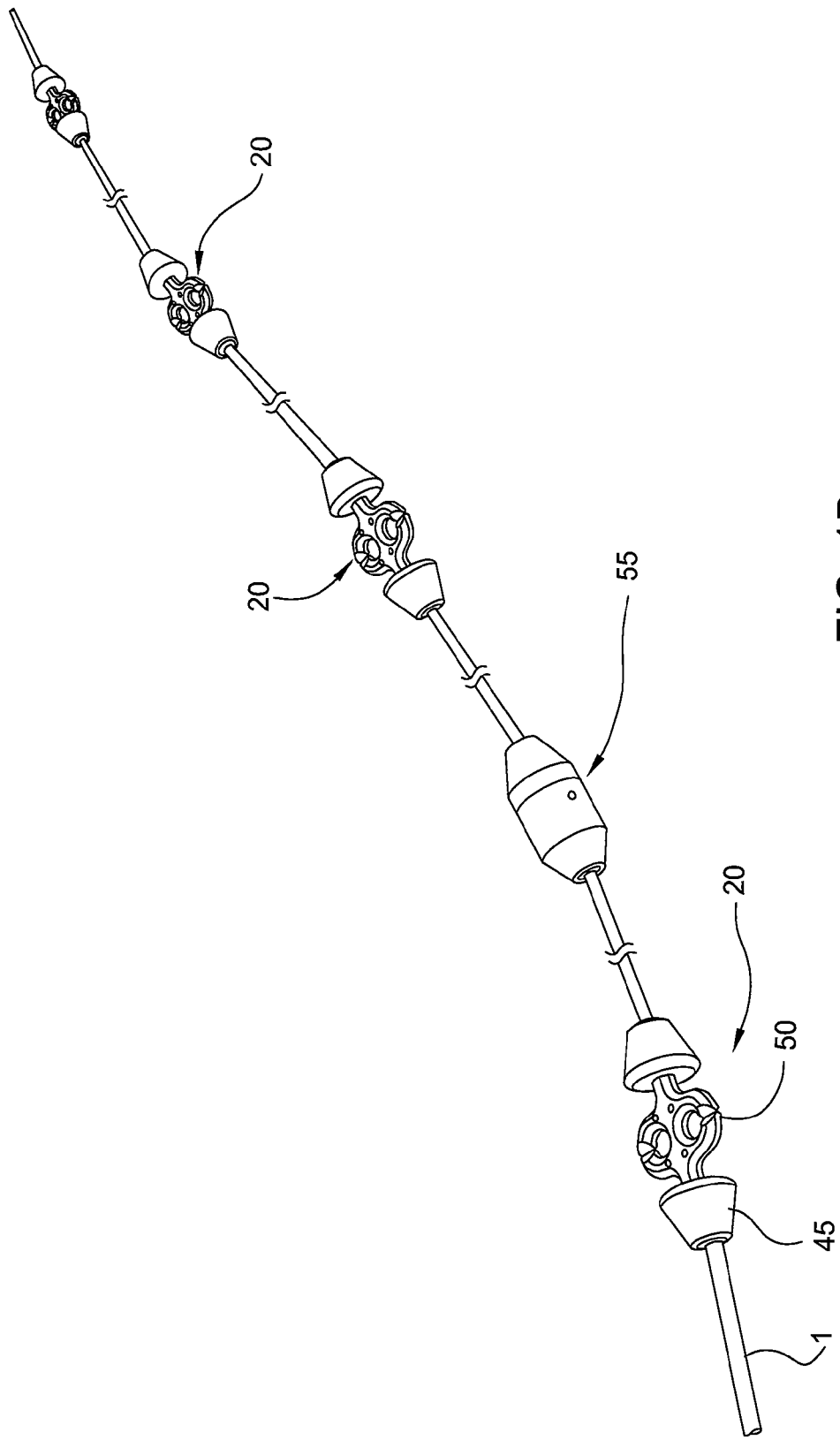
FIG. 1B (Prior Art) is a perspective view of a portion of a seismic cable.

Embodiments described herein generally provide methods and apparatus for a seismic cable. In some embodiments, a connector is described for coupling at least two free ends of the seismic cable. While embodiments described herein are exemplarily described in reference to a seismic cable, some embodiments may be used in other industries or applications.

FIG. 2A is a perspective view of a portion of one embodiment of a section 200 of a seismic cable. The section 200 of seismic cable includes a first cable segment 210A and a second cable segment 210B having ends coupled together by a connector 215. The connector 215 includes a body 220 having a first end 222 and a second end 224 opposing the first end 222. The first cable segment 210A and second cable segment 210B have respective ends that terminate at the body 220. The body 220 of the connector 215 also includes at least three coupling sections, shown as a central coupling section 225, a first coupling section 230A and a second coupling section 230B. The first and second coupling sections 230A, 230B are coupled to respective ends of the central coupling section 225 and disposed in an opposing relationship and longitudinally relative to the central coupling section 225. The central coupling section 225 may include a groove 240 formed radially in the body 220. The groove 240 serves as a connection area for a node tether 242. The node tether 242 may include a clamp device 245 and a length of rope or flexible cable 247 that is adapted to couple to a node (shown in FIG. 8A). The clamp device 245 may be a D-ring, a carabineer clamp, or a shackle, among other securing devices. Alternatively, the node tether 242 may be a length of rope or flexible cable adapted to loop or otherwise attach to the groove 240 at one end and attach to a node at another end.

The body 220 is at least partially formed from a material chosen for strength and durability. The material of the body 220 may also be selected to attenuate noise caused by connected hardware or other external interactions. In one embodiment, the body 220 is made at least partially from a metallic material, such as aluminum. Additionally, the body 220 may be coated with an electrically insulative material, and/or a sound insulating or noise attenuating material, such as an epoxy coating. In another embodiment, the body 220 is made at least partially of a high-strength polymeric material. In one embodiment, the connector 215 isolates one cable segment 210A from adjacent cable segments 210B while maintaining a physical connection between the cable segments 210A, 210B. In another embodiment, the connector 215 isolates one cable segment 210A from an adjacent cable segment 210B fluidly, electrically, optically, and combinations thereof while maintaining a physical connection between the cable segments 210A, 210B. For example, although the cable segments may not be configured to transmit data or signals, the connector 215 isolates adjacent cable segments 210A, 210B in a manner that any signals or data that may be transmitted through or by one cable segment 210A is not communicated to an adjacent cable segment 210B.

The connector 215 features a streamlined shape to minimize areas where personnel could be injured as well as minimizing jagged or sharp corners that could lead to binding, snagging, or tangling of the section 200 with machinery and/or personnel. Additionally, in one embodiment, the body 220 is cylindrical and includes a first dimension, such as a diameter, and tapers to a second dimension, such as a diameter, that is about equal to or slightly greater than a diameter of the cable segments 210A, 210B. For example, each of the cable segments 210A, 210B may have an outside diameter of about 0.5 inches to about 0.8 inches, such as about 0.75 inches. In this example, at least a portion of the central coupling section 225 may include a first diameter of about 3 inches to about 2 inches, such as about 2.5 inches. The connector 215 further includes tapered sections 250 that taper to a second diameter that is slightly larger than the diameter of the cable segments. In one example, the tapered sections transition to a diameter of between about 0.55 inches to about 0.9 inches at the end adjacent the cable segments, for example, 0.8 inches or larger. While the connector 215 is shown as cylindrical, other shapes may be used, such as oval shapes, rectangular shapes, triangular shapes, hex shapes, octagonal shapes, and other shapes that minimize sharp edges. For example, a substantially triangular shape could be used and the corners may be truncated, beveled, or rounded. The streamlined construction of the connector 215 provides enhanced operation by eliminating or minimization of edges or areas that may snag, bind or tangle with portions of a cable section, personnel, or machinery. Moreover, the streamlined profile contributes to minimizing cable drift during a deployment operation.

Figure 2B:
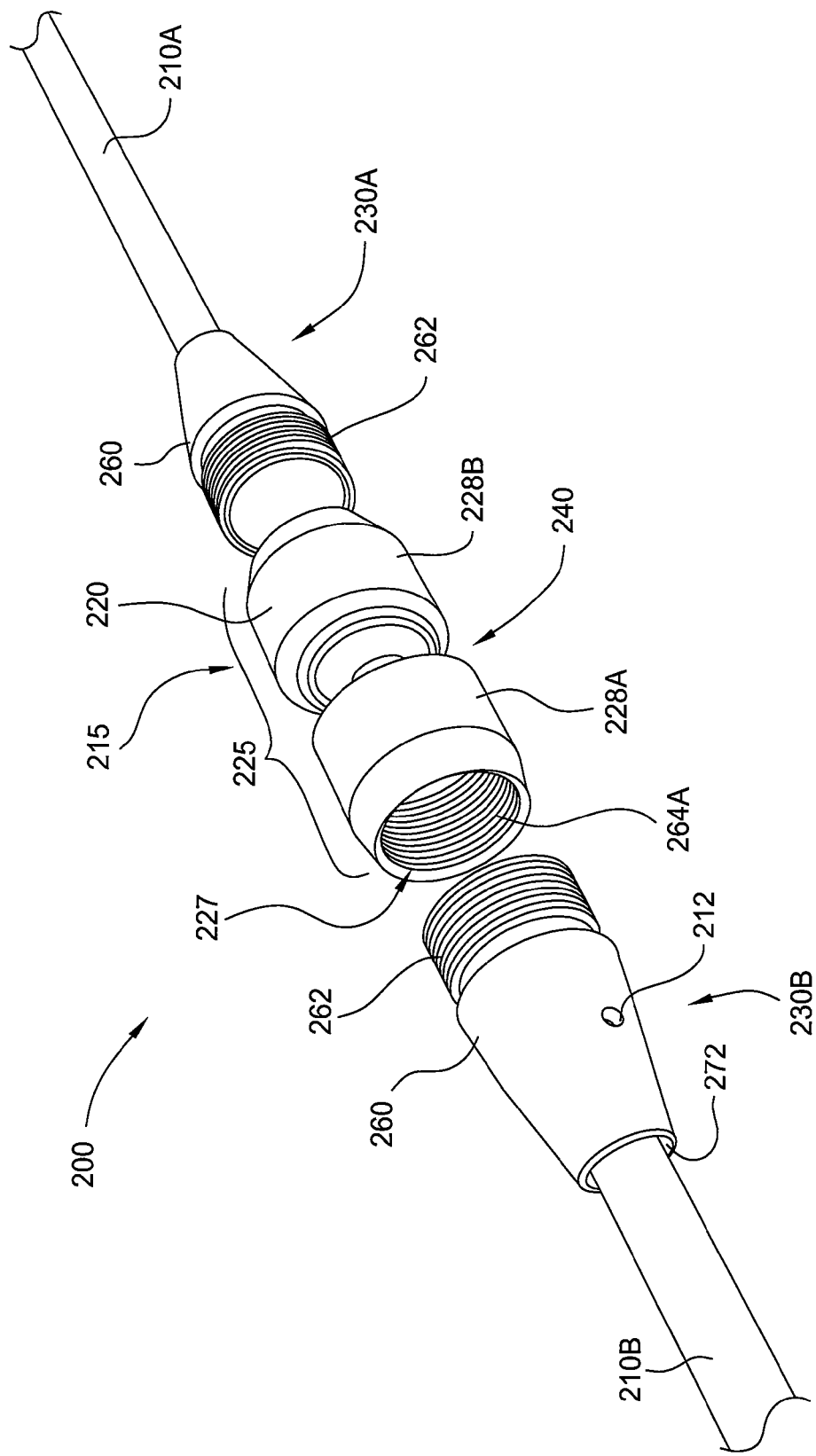
FIG. 2B is an exploded perspective view of the cable connector shown in FIG. 2A.

FIG. 2B is an exploded perspective view of the connector 215 shown in FIG. 2A, wherein the first coupling section 230A and the second coupling section 230B are detached from the central coupling section 225. In one embodiment, the connector 215 is formed by a plurality of detachable coupling members shown as cable couplers 260. Each of the cable couplers 260 include a streamlined body having a first end with an outside dimension that substantially matches the outside dimension of the central coupling section. The outside dimension tapers, slopes, or is rounded, at the end opposite the end that mates with the central coupling section 225, to a smaller dimension. Each of the cable couplers 260 may include a threaded portion adapted to couple to the central coupling section 225. In this embodiment, each cable coupler 260 has a threaded end 262 adapted to couple to respective ends of the central coupling section 225, such as a first end 228A and an opposing end 228B of the central coupling section 225.

Each end 228A, 228B of the central coupling section 225 includes a bore 227 defining recesses with threaded portions 264A, 264B (only threaded portion 264A is shown) formed therein. The threaded portions 264A, 264B may be right hand threads or left hand threads. In one embodiment, threaded portion 264A of the first end 228A includes right handed threads and the threaded portion of the opposing end 228B includes left handed threads such that the central coupling section 225 may couple to both cable couplers 260 simultaneously in a turnbuckle fashion. In this embodiment, the first threaded ends 262 of each cable coupler 260 would include appropriate right or left handed threads. The ends of the cable couplers 260 may include an opening 272 sized larger than the outer diameter of the cable segments 210A, 210B, which allows rotation of the couplers 260 relative to the cable segment 210A, 210B. Thus, each cable coupler 260 may include right or left handed threads to facilitate rotational coupling. Seals (not shown), such as washers may be provided in the opening 272 at the interface between the cable couplers 260 and the cable segments. The washers may be configured to seal the interface between the outer diameter of the cable segments 210A, 210B to prevent or minimize the introduction of sand, water and/or debris into the cable couplers 260.

The threaded portions disposed in the connector 215 may be appropriately rotated to mate at the respective interfaces and tightened to provide suitable coupling. Any of the sections 230A, 230B, 225 may further contain a tool interface 212 to aid in the tightening or loosening of the sections 230A, 230B, 225 from one another. An example of such a tool interface 212 is a flat. Another example of a tool interface 212 is two holes (only one is shown on section 230A) spaced apart at about 180°. The holes 212 may be adapted to couple with a spanner wrench or other tool adapted to provide rotation of section 230A. An adhesive may be applied to the threaded portions to lock the threaded portions at the respective interfaces. The adhesive may be a pressure and/or heat sensitive adhesive. In one embodiment, adhesive may be applied to the threaded portions and allowed to cure over time, and the adhesive may be heated in order to loosen the threaded connections to disassemble the connector 215. Although the above embodiments have been described with the cable couplers 260 disposed within the ends 228A, 228B of the central coupling section 225, it is contemplated that the connection between the cable coupler 260 to the central coupling section 225 could be configured differently. For example, the cable coupler 260 could be of a larger diameter than the central coupling section 225. In this example the cable coupler 260 may have a recess with internal threading configured to receive threading on an external portion of the central cable coupling section 225.

Figure 2C:
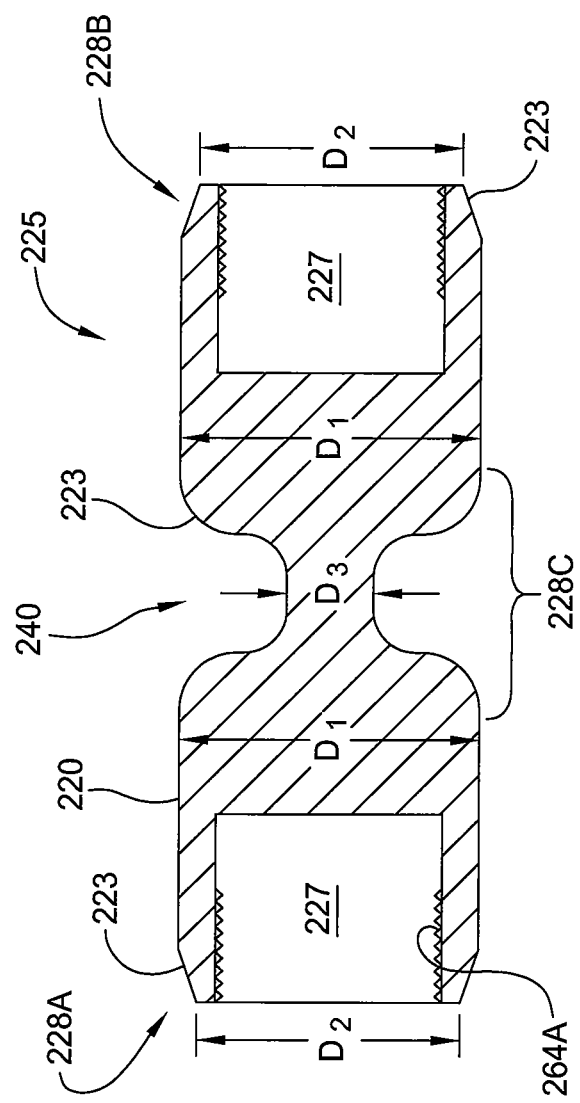
FIG. 2C is a cross-sectional view of one embodiment of a central coupling section.

FIG. 2C is a cross-sectional view of one embodiment of a central coupling section 225. The central coupling section 225 includes a cylindrical body 220 having a first end 228A and a second end 228B with a central section 228C therebetween. In one embodiment, the body 220 includes a first diameter $D_1$ that tapers to a second diameter $D_2$ at each end 228A, 228B that is smaller than the first diameter $D_1$. In one embodiment, the central section 228C includes a first diameter $D_1$ of about 3 inches to about 2 inches, such as about 2.5 inches, and the body 220 tapers to a second diameter $D_2$ between about 2.75 inches to about 1.75 inches, such as about 2.25 inches. The body 220 also includes a third diameter $D_3$ that is smaller than the first diameter $D_1$ and second diameter $D_2$. In one embodiment, the third diameter $D_3$ is equal to or greater than the diameter of the cable segments 210A, 210B. For example, the third diameter $D_3$ may be between about 0.75 inches to about 1.0 inches, or larger. The reduced third diameter $D_3$ provides an attachment point for a node as described above.

In one embodiment, the body 220 includes circumferential relieved portions 223 that transition the diameters $D_2$ and $D_3$ from the first diameter $D_1$. The circumferential relieved portions 223 may be chamfers, radii, or gradual sloping or tapered surfaces.

Figure 3:
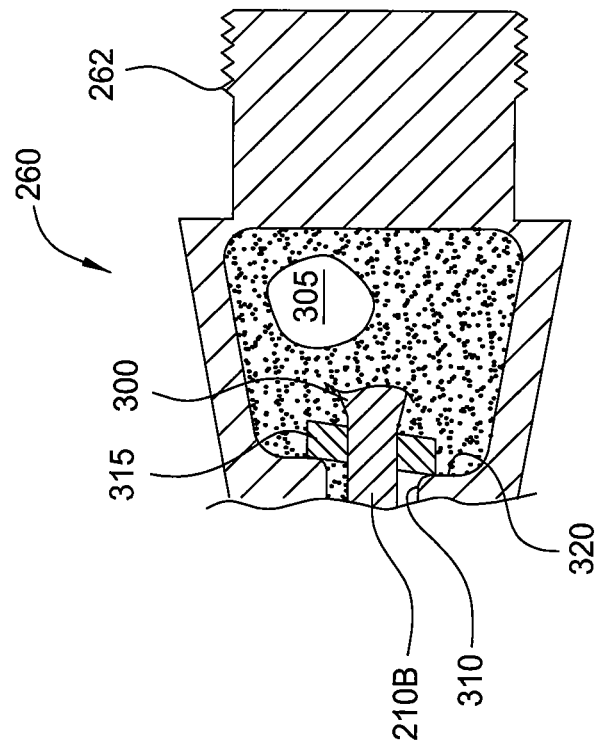
FIG. 3 is a cross sectional view of one embodiment of a cable coupler.

FIG. 3 is a cross sectional view of the cable coupler 260 shown in FIG. 2B. In one embodiment, the cable coupler 260 comprises a hollow body and is configured to anchor terminating ends 300 of respective cable segments 210A, 210B (cable segment 210B is shown in this view) therein. The terminating end 300 may be disposed through an opening 310 of the cable coupler 260 and into an interior bore 305. The terminating end 300 may be maintained or anchored in the interior bore 305 by a suitable cable termination device or method. The cable segment 210B may be retained in the cable coupler 260 in a manner that allows or prevents rotation relative to the cable coupler 260. In one embodiment, a retainer 315 may be disposed about and coupled to the outer diameter of the terminating end 300. The retainer 315 is adapted to contact a shoulder 320 disposed in the bore 305 to hold the cable segment 210B to the cable coupler 260.

Figure 4:
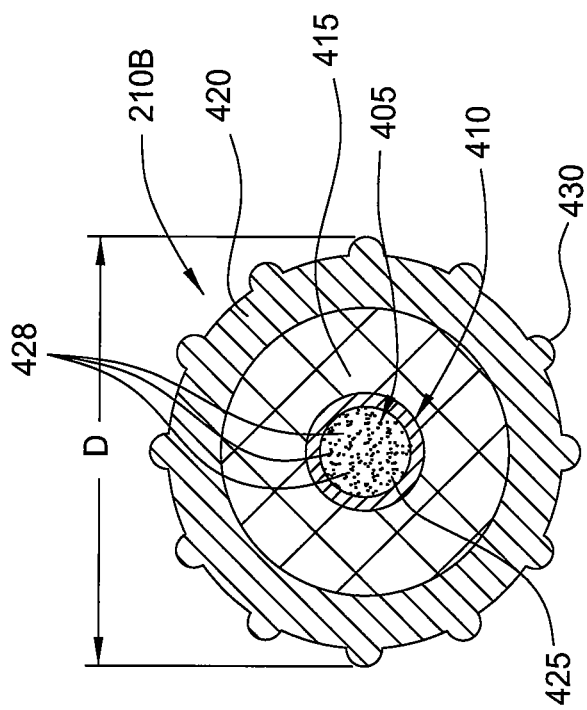
FIG. 4 is a cross-sectional view of one embodiment of a cable segment.

FIG. 4 is a cross-sectional view of one embodiment of a cable segment 210B. The cable segment 210B includes a hollow tubular core 405 disposed in an inner jacket 410. The inner jacket 410 is disposed inside a stranded polymer core 415 that is covered with an outer jacket 420. The cable segment 210B is strong enough to couple a plurality of seismic devices along a length thereof. The cable segment 210B is highly flexible to facilitate handling of the cable, for example, in reeling or spooling of the cable segment 210B. The cable segment 210B may also have a high tensile modulus with low-creep. In one embodiment, the cable segment 210B may include a break strength of about 20,000 pounds to about 35,000 pounds, for example, between about 27,000 pounds to about 32,000 pounds.

The stranded polymer core 415 of the cable segment 210B may be made of a fiber or yarn that may be braided to provide additional strength. In one embodiment, the stranded polymer core 415 is made of an aromatic polyamide fiber, for example, a liquid crystal polymer (LCP) material, such as a VECTRAN™ fiber or yarn. The outer jacket 420 may be made of a polyurethane material to protect the stranded polymer core 415 and facilitate noise attenuation. The outer jacket 420 may also include protrusions 430 that are configured as raised ridges extending radially outward from the outer jacket 420 to form channels therebetween. In one embodiment, the protrusions 430 are disposed along the length of the cable segment and parallel to the longitudinal axis of the cable segment. The protrusions 430 are configured to provide increased drag and/or enhance hydrodynamic attributes of the cable. The cable segment 210B includes a diameter D (measured at opposing ridges) between about 0.70 inches to about 0.90 inches, for example 0.75 inches.

In one embodiment, the cable segment 210B is configured to have an adjustable buoyancy based on parameters set by the user. For example, the weight of the cable segment 210B may be adjusted to minimize buoyancy and facilitate a faster fall or "sink" of the cable segment 210B in water. In one embodiment, the specific gravity of the cable segment 210B may be adjusted to be greater than the specific gravity of seawater. In one embodiment, the cable segment 210B is configured to provide an adjustable buoyancy metric of the cable segment 210B that may sacrifice available real estate of the cable segment 210B for additional strength. In this embodiment, the inner jacket 410 may be made of a polyurethane material configured as a flexible tube to facilitate separation between the core 405 and the stranded polymer core 415. For example, the inner jacket 410 may surround the core 405 to form a void. In this embodiment, the core 405 may be empty or configured to contain a material 425 that facilitates additional buoyancy or provides additional weight to the cable segment 210B. In one embodiment, the material 425 may be a fluid, such as a gas or liquid. The fluid may be a liquid or gas that is chosen for buoyancy or weighting of the cable segment 210B. In one embodiment, the material 425 may be water, air, among other gases or fluids configured to provide buoyancy to the cable segment 210B. As another example, the material 425 may be configured to provide additional weight to the cable segment 210B to minimize buoyancy or cause the cable to sink. In one embodiment, the material 425 includes a flexible metallic material and/or a plurality of discrete particles 428 of metallic material configured to provide weight and flexibility to the cable segment 210B.

In one embodiment, the material 425 includes a metallic material, such as steel, or stainless steel, among other metals. The metallic material may be in the form of a wire or strip, or a plurality of discrete particles 428 such as beads or pellets. In one embodiment, the material 425 includes a lead (Pb) material. The lead material may be a wire or a plurality of discrete lead pieces, such as lead shot. In this embodiment, material 425 is configured to provide additional weight to the cable segment 210B without adding additional tensile strength to the cable segment 210B.

In one embodiment, the core 405 is provided with a lead (Pb) material to increase the weight of the cable segment 210B. The cable segment 210B having a core 405 according to this embodiment may have a weight in air between about 240 pounds per 1000 feet (lbs/Mft) to about 330 lbs/Mft and a weight in seawater of about 70 lb/Mft to about 92 lb/Mft, respectively. In one embodiment, the cable segment 210B having the aforementioned material includes a specific gravity greater than seawater, for example, a specific gravity between about 1.25 to about 1.6. In another embodiment, the cable segment 210B includes a specific gravity between about 1.35 to about 1.5, such as about 1.45.

Figure 5A:
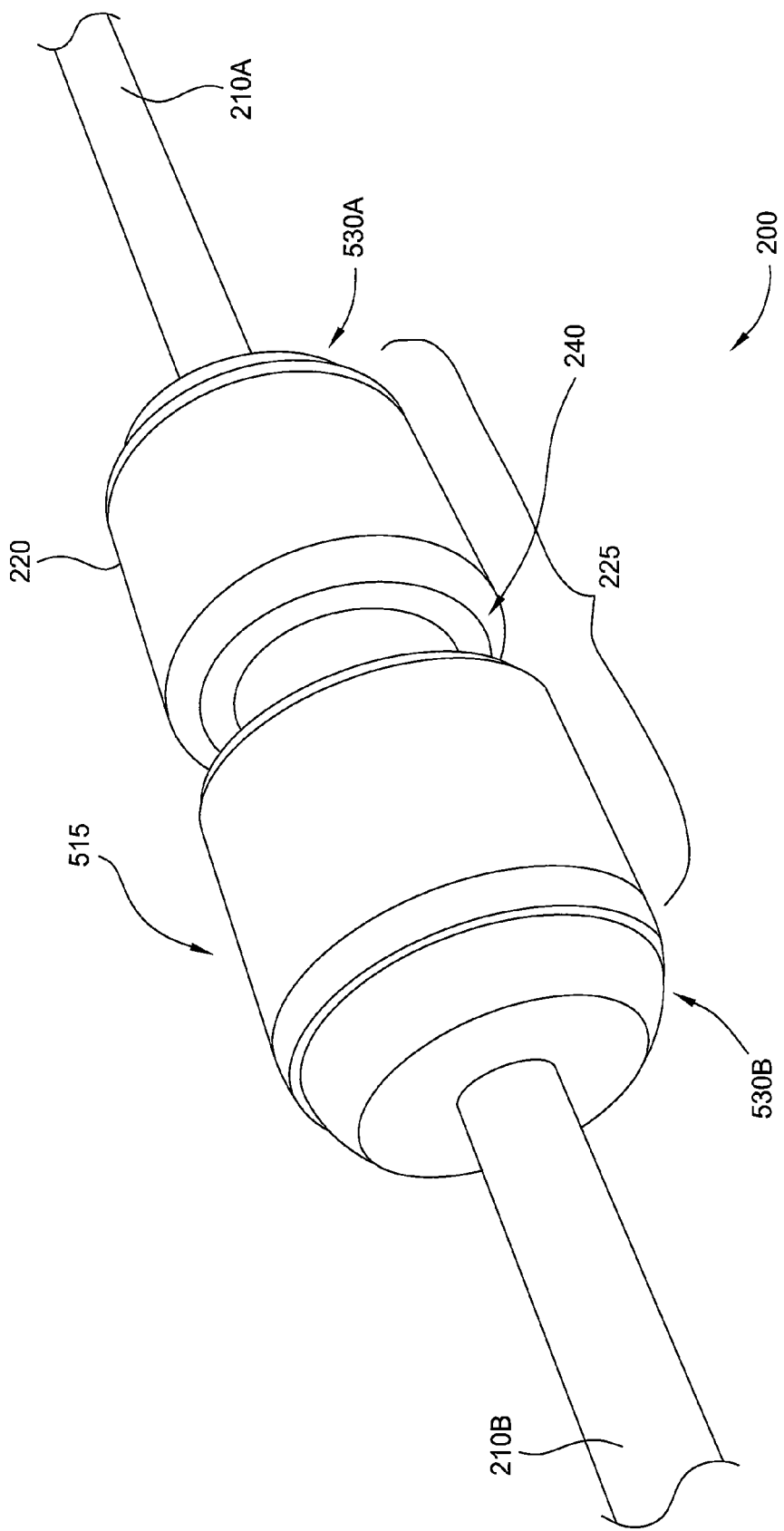
FIG. 5A is a perspective view of another embodiment of a cable connector coupling two cable segments.

FIG. 5A is a perspective view of a portion of a section 200 of a seismic cable having another embodiment of a connector 515. The connector 515 includes a body 220 having at least three coupling sections, shown as a central coupling section 225, a first coupling section 530A and a second coupling section 530B, the first and second coupling sections 530A, 530B disposed in an opposing relationship and laterally or longitudinally relative to central coupling section 225. In this embodiment, the connector 515 facilitates rotation of the cable segments 210A, 210B. Specifically, the connector 515 includes a rotatable interface provided by one or both of the central coupling section 225 and first and second coupling sections 530A, 530B.

Figure 5B:
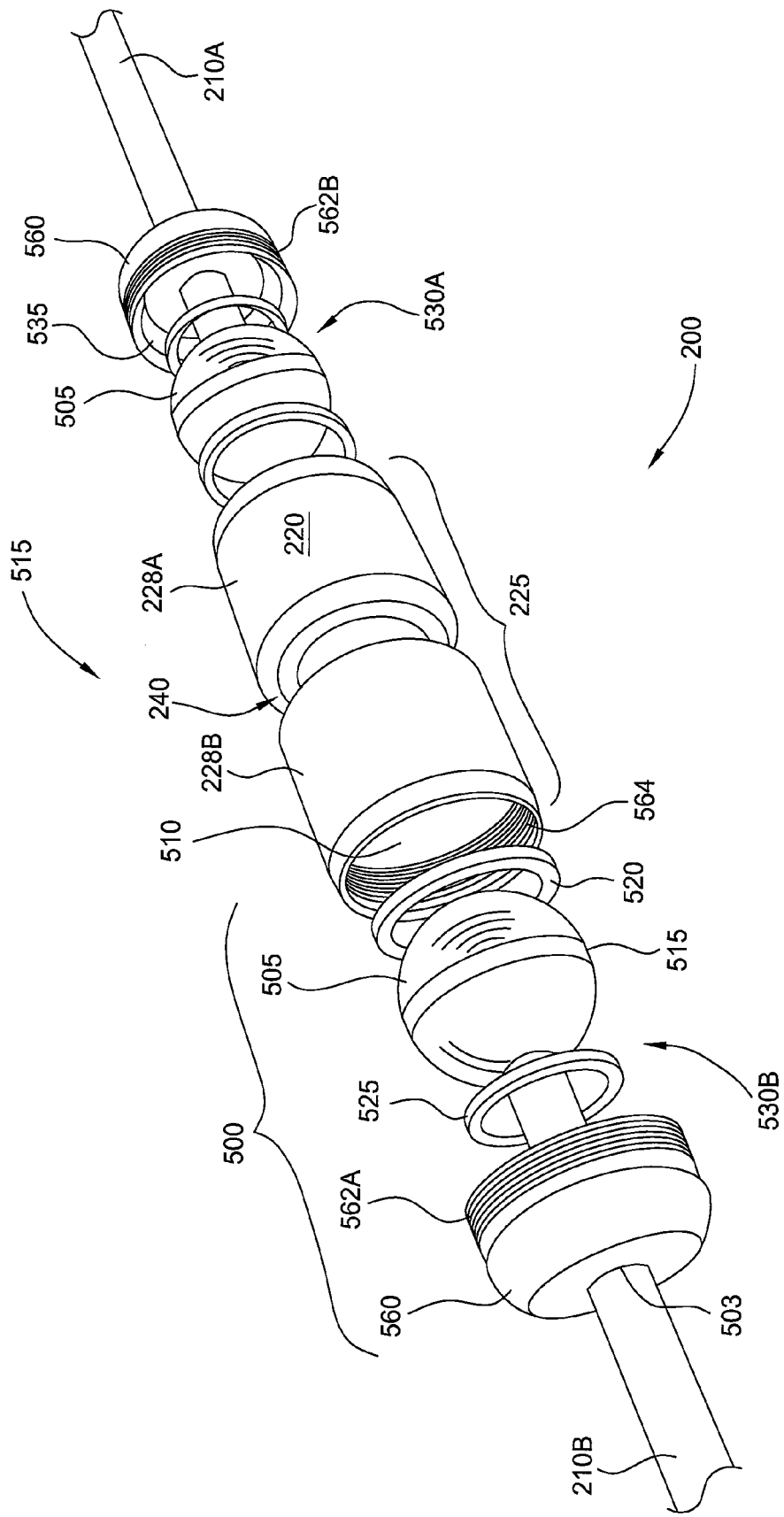
FIG. 5B is an exploded perspective view of the cable connector shown in FIG. 5A.

FIG. 5B is an exploded perspective view of the connector 515 shown in FIG. 5A, wherein the first coupling section 530A and second coupling section 530B are detached from the central coupling section 225. In one embodiment, the connector 515 is formed by a plurality of detachable coupling members shown as cable couplers 560 at opposing ends of the connector 515. Each cable coupler 560 has a first threaded end 562A that is adapted to couple to threads 564 of respective ends of the central coupling section 225, such as a first end 228A and an opposing end 228B of the central coupling section 225.

In this embodiment, the connector 515 includes a rotatable connection 500 disposed on opposing ends of the connector 515. The rotatable connection 500 includes a circular member or ball 505 that is disposed between each cable coupler 560 and the central coupling section 225. The ball 505 may be at least partially disposed in a recess, such as socket 510, formed by a bore in the first end 228A and second end 228B (only first end 228A is shown in this view) of the central coupling section 225. The ball 505 is adapted to couple to a terminating end of each of the cable segments 210A, 210B by a suitable technique. In one example, the ball 505 is attached to the terminating end of each of the cable segments 210A, 210B by a swage, crimp, an adhesive, potting, or other manner. In one embodiment, each of the terminating ends of the cable segments 210A, 210B are potted with an epoxy compound within the ball 505. The ball 505 may also include a relief, such as a flat 515 that allows rotation of the ball 505 while limiting or eliminating articulation of the cable segments 210A, 210B. The ball 505 is adapted to contact an arcuate bearing surface 535 disposed on an inner surface of each cable coupler 560, which allows the ball 505 to rotate relative to each cable coupler 560 along the central axis of the connector 515 while preventing rotation along other axes. Each of the cable couplers 560 may also include an opening 503 adapted to receive the outer diameter of the cable segments 210A, 210B. Each of the openings 503 may be sized to allow rotation of the cable segments 210A, 210B while limiting articulation or bending of the cable segment 210A, 210B relative to each cable coupler 560.

The ball 505 is adapted to rotate relative to the connector 515 to relieve torsional forces that may be encountered by each of the cable segments 210A, 210B. In one embodiment, each cable segment 210A, 210B is adapted to rotate 360°. Rotation of the ball 505 may be also be adjusted to allow or limit rotation of the cable segments 210A, 210B. In one embodiment, the adjustment may be provided by tightening or loosening the interface between the cable couplers 560 and the central coupling section 225. For example, rotation may be minimized by tightening the cable couplers 560 against the central coupling section 225. To promote rotation, the cable couplers 560 may be loosened. In another example, stops (not shown) may be provided on one or both of the ball 505 and socket 510. Seals, such as washers 520, 525 may be provided at the interface between the ball 505 and central coupling section 225 and cable coupler 560. The washers may be made from a fluorocarbon material, for example a TEFLON® material, and may additionally include a backing made of an aluminum/bronze material. The washers 520, 525 may be wiper seals adapted to minimize introduction of seawater, sand, or debris into the rotatable connection 500.

Figure 6A:
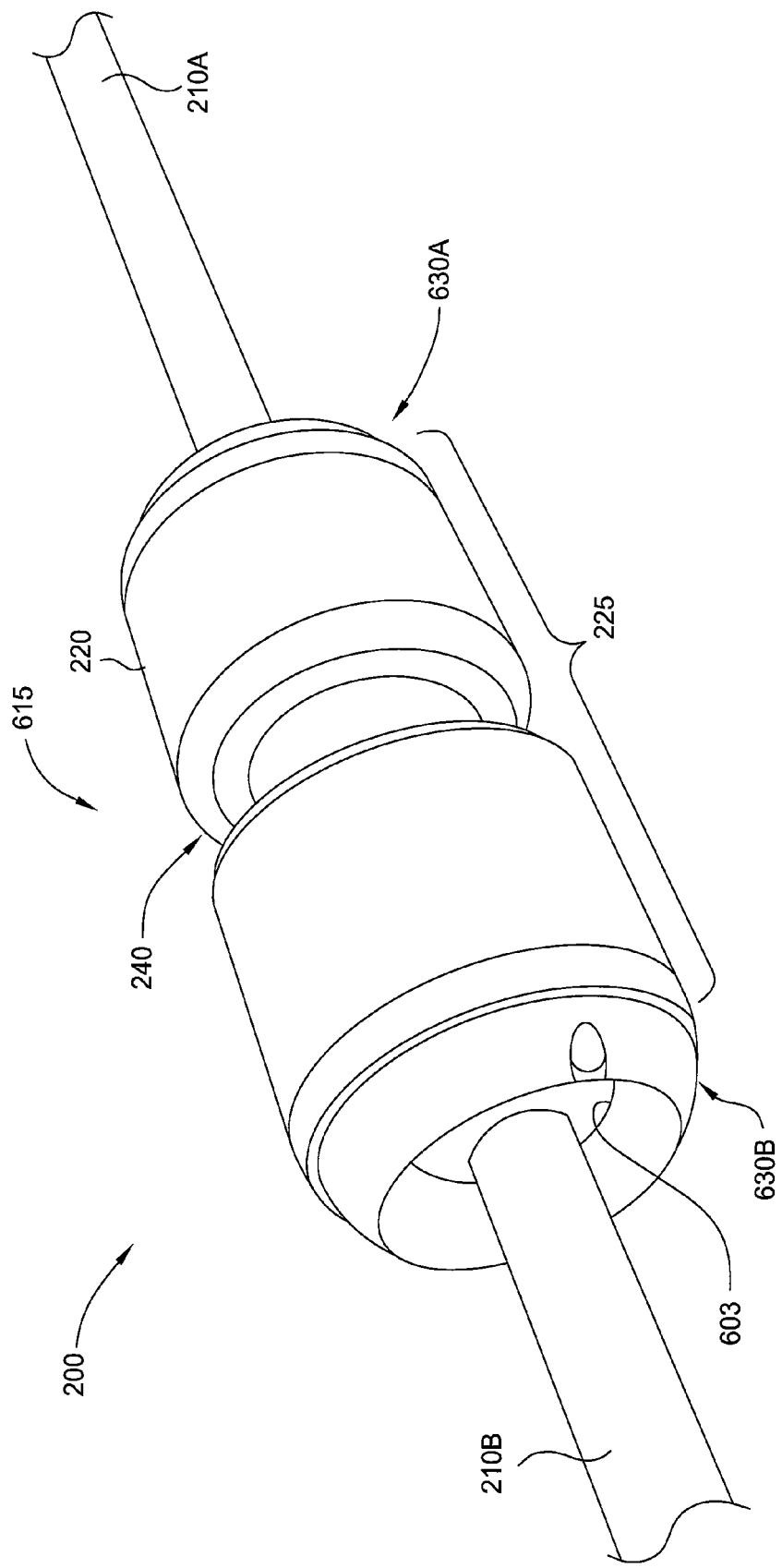
FIG. 6A is a perspective view of another embodiment of a cable connector coupling two cable segments.

FIG. 6A is a perspective view of a portion of a section 200 of a seismic cable having another embodiment of a connector 615. The connector 615 includes a body 220 having at least three coupling sections, shown as a central coupling section 225, a first coupling section 630A and a second coupling section 630B. The first and second coupling sections 630A, 630B disposed in an opposing relationship or longitudinally relative to central coupling section 225. In this embodiment, the connector 615 facilitates both rotation and articulation of the cable segments 210A, 210B. Specifically, the connector 615 includes a rotatable and articulatable interface provided by one or both of the central coupling section 225 and first and second coupling sections 630A, 630B.

FIG. 6B is an exploded perspective view of the connector 615 shown in FIG. 6A, wherein the first coupling section 630A and second coupling section 630B are detached from the central coupling section 225. In one embodiment, the connector 615 is formed by a plurality of detachable coupling members shown as cable couplers 660 at opposing ends of the connector 615. Each cable coupler 660 has a first threaded end 662A that is adapted to couple to threads 664 of respective ends of the central coupling section 225, such as a first end 228A and an opposing end 228B of the central coupling section 225.

In this embodiment, the connector 615 includes a rotatable and articulatable connection 600 disposed on opposing ends of the connector 615. The rotatable and articulatable connection 600 includes a circular member or ball 505 that is disposed between each cable coupler 660 and the central coupling section 225. The ball 505 may be at least partially disposed in a recess, such as socket 610, formed by a bore in the first end 228A and second end 228B (only first end 228A is shown in this view) of the central coupling section 225. The ball 505 as adapted to couple to a terminating end of each of the cable segment 210A, 210B by a suitable technique. In one example, the ball 505 is attached to the terminating end of each of the cable segments 210A, 210B by a swage, crimp, an adhesive, potting, or other bond. The ball 505 may be made of stainless steel, with a polished surface to minimize friction. The ball 505 is adapted to contact an arcuate bearing surface 635 disposed on an inner surface of the cable coupler 660, which allows rotation along the central axis of the connector 615 and articulation of the cable segments 210A, 210B relative to the central axis of the connector 615. Washers 520, 525 may be provided at the interface between the ball 505 and central coupling section 225 and cable coupler 660. The washers 520, 525 may be wiper seals adapted to minimize introduction of seawater, sand, or debris into the rotatable connection 600. Alternatively, openings (not shown) may be formed in the body 220 of the connector 615 to allow sand, water, or debris to be washed out of the interior of the body 220. Each of the cable couplers 660 may also include an opening 603 adapted to receive the outer diameter of the cable segments 210A, 210B and allow rotation and articulation of the cable segments 210A, 210B relative to each cable coupler 660.

The rotatable and articulatable connection 600 provides independent rotation and/or bending of the cable segments 210A, 210B relative to the body 220 of the connector 615. The articulating feature is provided to increase cable lifetime by reducing flex fatigue from factors such as inequality in seismic sensor weight, turbulence from water, and pass-through of the cable segments 210A, 210B through a cable handling device.

FIG. 6C is a perspective view of a portion of the connector 615 shown in FIG. 6A. The ball 505 is adapted to rotate relative to the connector 615 to relieve torsional forces that may be encountered by each of the cable segments 210A, 210B. Additionally, the cable segments 210A, 210B (only segment 210B is shown) may bend or pivot angularly relative to the body 220 of the connector 615. In one embodiment, the body 220 includes a longitudinal axis 620 and the cable segment 210B includes a centerline 621. The ball 505 allows the centerline 621 of the cable 210B to be moved to an angle α relative to the longitudinal axis 620. In one embodiment, the angle α is between 0° and 45° Rotation and/or articulation of the ball 505 or cable segment 210B may be adjusted to allow or limit rotation and/or bending of the cable segments 210A, 210B. In one embodiment, the adjustment may be provided by tightening or loosening the interface between the cable couplers 660 and the central coupling section 225. For example, rotation may be minimized by tightening the cable couplers 660 against the central coupling section 225. To promote rotation, the cable couplers 660 may be loosened. In another example, stops (not shown) may be provided on one or both of the ball 505 and socket 510. Articulation may be adjusted by the size of the opening 603. For example, the diameter of the opening may be chosen to function as a stop for the cable segment 210B.

Figure 7A:
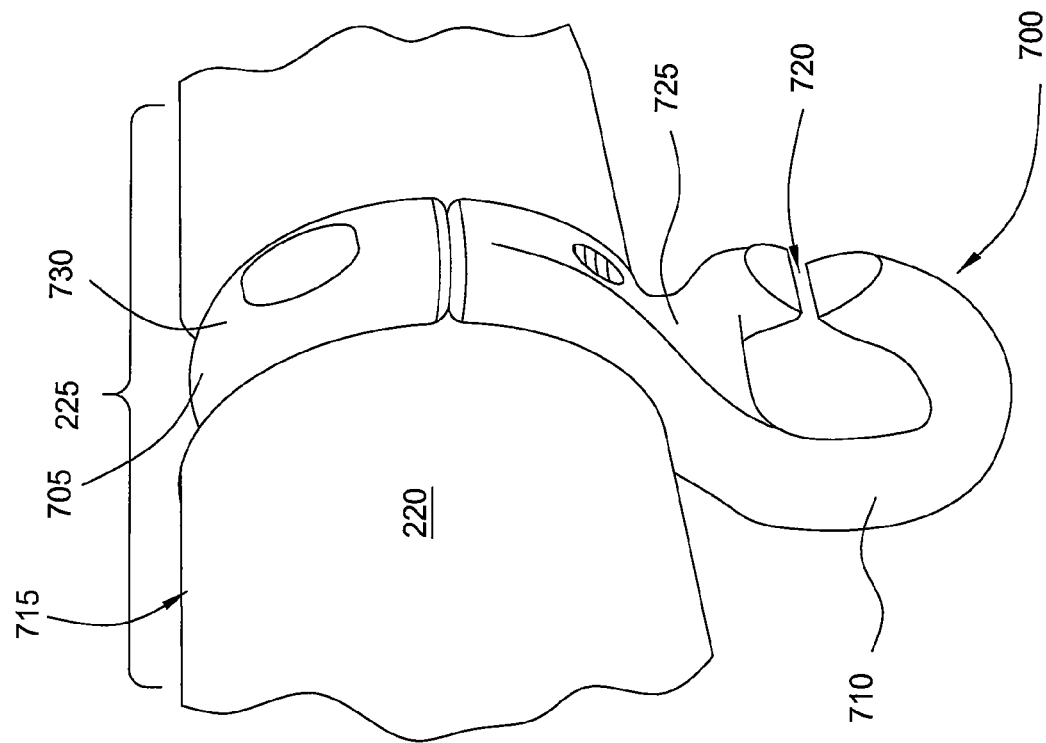
FIG. 7A is a perspective view of a portion of one embodiment of a connector which includes a rotatable clamp.

FIGS. 7A and 7B are a perspective view and a side view, respectively, of a portion of one embodiment of a connector 715 which includes a rotatable clamp 700 disposed on a central coupling section 225. The connector 715 may be any of the connectors 215, 515 and 615 as described above. In this embodiment, the rotatable clamp 700 includes a swivel portion 705 and an attachment ring 710 coupled by a neck 725. The swivel portion 705 is configured to be easily coupled within the groove 240 and is rotatable relative to the groove 240 and/or the connector 715. The attachment ring 710 is configured as an attachment point for a node (shown as 809 in FIGS. 8A and 8B). In one example, the attachment ring 710 may serve as an attachment point for a node tether 242 and/or a clamp device 245 as described in FIG. 2A. In one embodiment, the attachment ring 710 is shaped as a D-ring and may be discontinuous or include a gap 720 to define a split ring.

In this embodiment, an outer dimension 730 of the swivel portion 705 is substantially circular and transitions to the neck 725. The circular portion of the outer dimension 730 may define a diameter $D_4$ that is equal to or slightly smaller than an outer diameter $D_1$ of the central coupling section 225. In the embodiment shown, the swivel portion 705 and attachment ring 710 are coupled together at a normal angle such that the plane of the attachment ring 710 is aligned with the longitudinal direction of the cable segments (not shown in this view). Alternatively, the planes of the swivel portion 705 and attachment ring 710 may be shared such that the swivel portion 705 and attachment ring 710 are coplanar (not shown).

FIG. 7C is a side view of one embodiment of a rotatable clamp 700, which includes a swivel portion 705 coupled to a neck 725 and disposed orthogonally to an attachment ring 710. In this embodiment, the swivel portion 705 is configured as a split ring which includes a first portion 740 and a second portion 750 adapted to provide attachment to the connector 715. Each portion 740, 750 are adapted to mate and couple together using at least one fastener, such as a bolt, screw, pins, a latch and the like. In this embodiment, the first portion 740 includes threaded holes 742 adapted to receive threaded portions of bolts 755 that are disposed through the second portion 750. Although not shown, other fastening devices may be used. As an example, one side of the swivel portion 705 may include a hinge at the interface between the first portion 740 and the second portion 750. In this example, a quick release latch, a lever-type latch or other fastening device may be disposed on the opposing side of the swivel portion 705 from the hinge such that the swivel portion 705 may be quickly attached to, and/or detached from, the connector 715. The rotatable clamp 700 may be made of a metallic material or a durable plastic material. In one embodiment, the rotatable clamp 700 is made of a stainless steel material.

An exemplary operational sequence of deploying and retrieving seismic sensors coupled to cable segments at connectors 215 is now described with reference to FIGS. 8A and 8B. While the operational sequences are described using the connectors 215, the connectors 215 may be replaced with or used in combination with any of the connectors 515, 615 and 715 as described above. The seismic sensors as described herein may include seismic devices used in Ocean Bottom Cabling (OBC) or Ocean Bottom Seismometer (OBS) systems. One type of seismic device includes a self-contained ocean bottom sensor unit, sometimes referred to as a Seafloor Seismic Recorder (SSR), which is configured to receive, record, and store seismic data. SSR's are typically detachably coupled to a length of rope or cable during deployment and retrieval operations. An example of a self-contained ocean bottom sensor unit is described in U.S. Pat. No. 7,310,287, which issued Dec. 18, 2007, and is incorporated herein by reference. The seismic sensor units as described herein may be used in OBS systems or OBC systems and are collectively referred to herein after as nodes for ease of description.

Figure 8A:
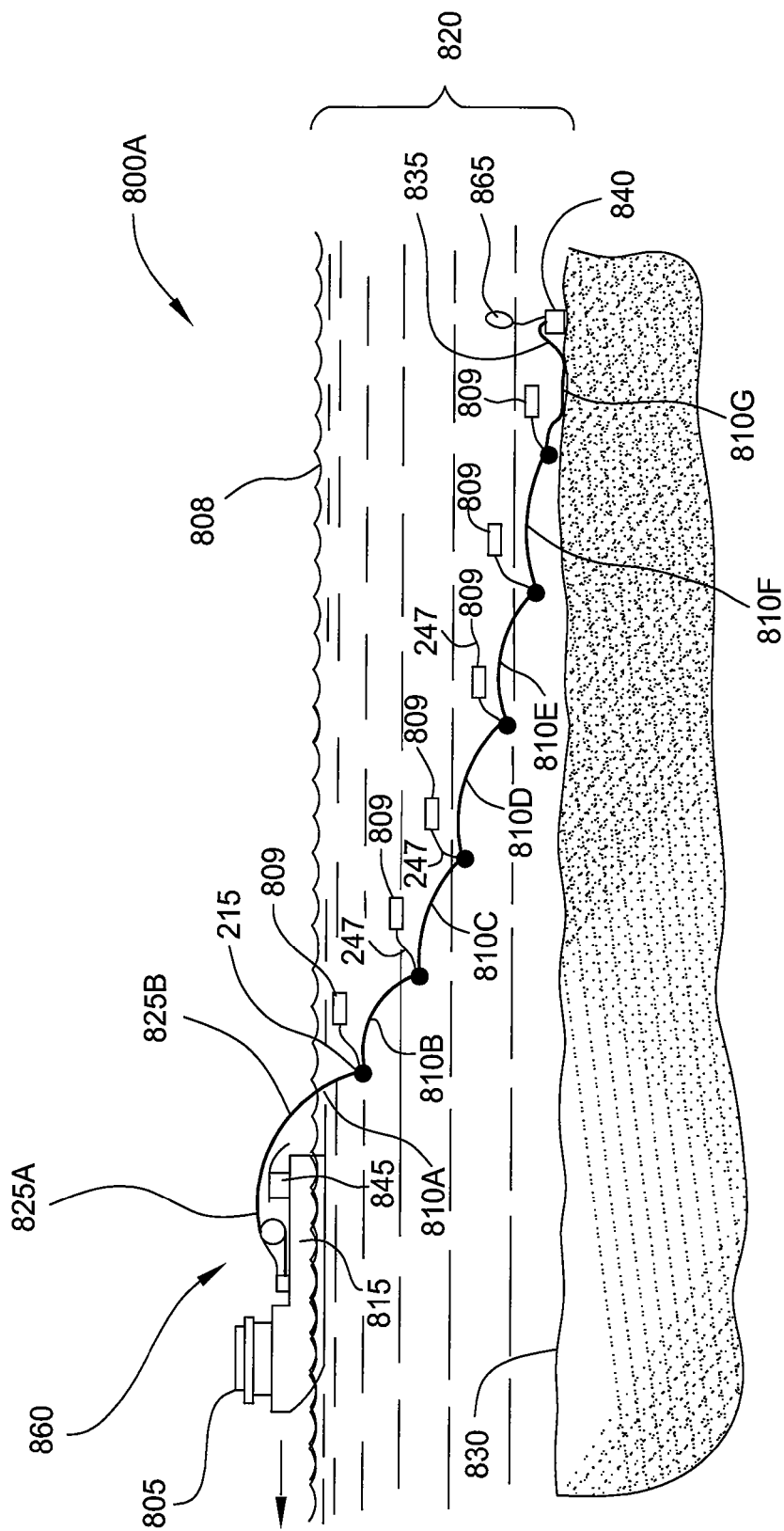
FIG. 8A is a schematic view of one embodiment of a seismic sensor deployment operation.

FIG. 8A is a schematic view of one embodiment of a node (i.e., sensor) deployment operation 800A. A vessel 805 is positioned on a body of water 808 to deploy nodes 809 from a backdeck 815 of the vessel 805 into a water column 820. Other deployment locations from the vessel 805 may alternatively be used. The power and/or momentum of the vessel 805 may be used to assist in paying out a cable 825A, which is comprised of one or more cable sections 810A-810F to which nodes 809 are attached. In this example, a plurality of nodes 809 are coupled to a non-rigid cable 825A by a tether 247. The cable 825A may be routed through a cable handler 860, which may be a spool, pulley, or sheave that may be powered or include a frictional device to control the pay-out and/or tension of the cable 825B during deployment. The cable 825A having the nodes 809 coupled thereto form a mainline cable 825B that is deployed into the water column 820. In one embodiment, a free end 835 of the mainline cable 825B is attached to an anchor device 840. The free end 835 may also be coupled to a flotation or buoyancy device 865 that may be selectively actuated to assist in locating and/or retrieving the cable 825B.

As the cable 825A is routed over the backdeck 815, the cable 825A passes a workstation 845 where nodes 809 may be attached to the cable 825A to form the mainline cable 825B. In one example, the nodes 809 are attached individually and sequentially to the cable 825A by personnel onboard the vessel 805, or by a suitable mechanical device, as the cable 825A passes the workstation 845. The mainline cable 825B sinks to a resting position on or near a floor 830 of the water column 820. Additional mainline cables may be deployed to form an array of nodes 809 along the floor 830. For example, additional mainline cables 825B may be deployed to form multiple lines or rows of mainline cables 825B along the floor 830. Once the mainline cable 825B is positioned on or near the floor 830, a seismic survey may be performed by initiating a seismic source signal and recording the reflected signals from the source.

Upon completion of the seismic survey, the mainline cable 825B may be retrieved from the water column 820. In one embodiment, the buoyancy device 865 is actuated to bring a free end 835 near the surface of the water column 820 where personnel on the vessel 805 may acquire and secure the mainline cable 825B.

Figure 8B:
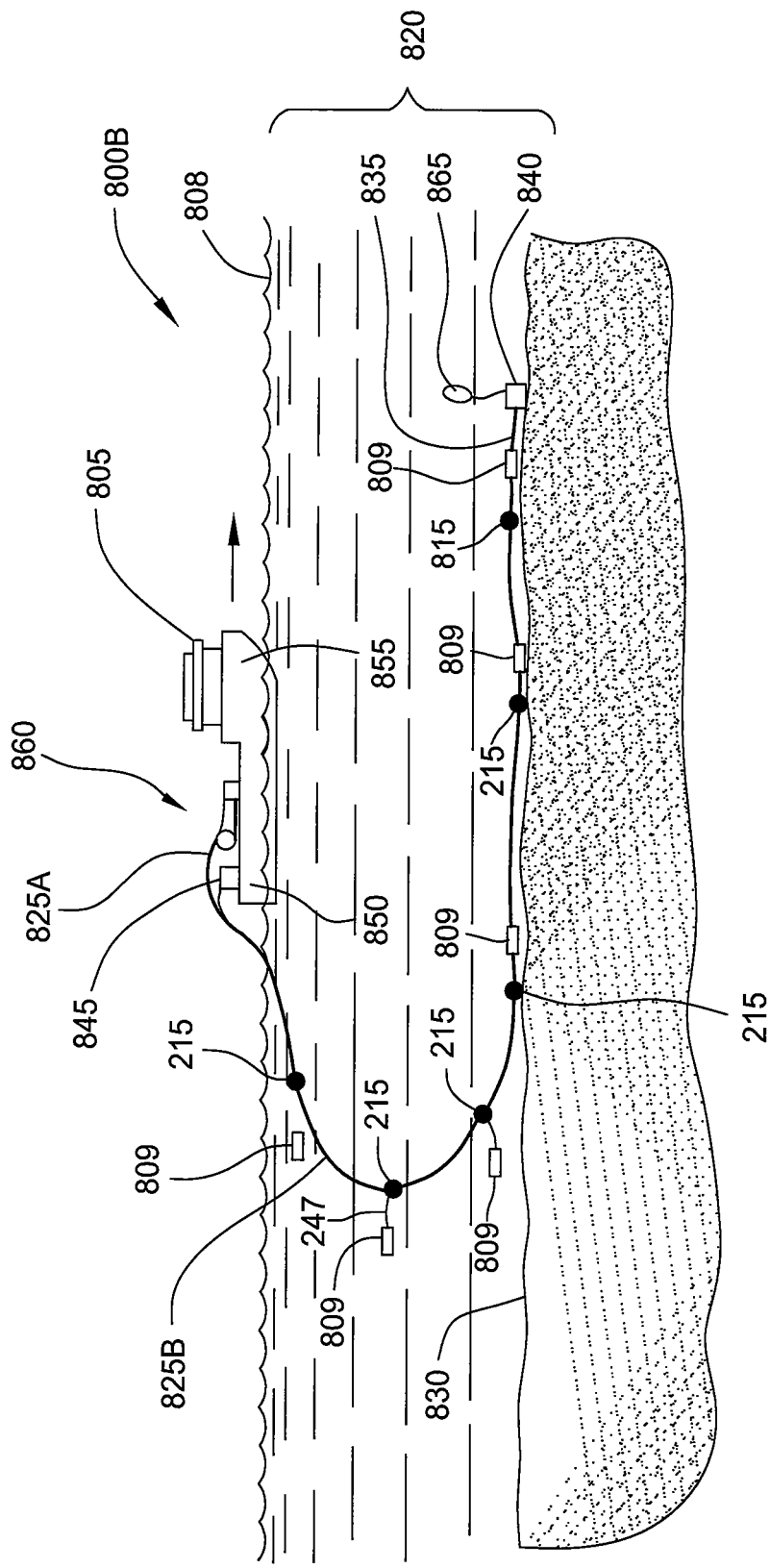
FIG. 8B is a schematic view of one embodiment a seismic sensor retrieval operation.

FIG. 8B is a schematic view of one embodiment a node retrieval operation 800B using a vessel 105. The vessel 805 has a stern 850 and a bow 855. In this example, the mainline cable 825B is retrieved over the stern 850 of the vessel 805 as the bow 855 of the vessel travels over the mainline cable 825B disposed on the floor 830 in the general direction toward the anchor device 840. The "over the stern" retrieval method uses the water column 820 to reduce dragging, excess tensioning and/or pulling of the cable 825B across the floor 830 as the cable 825B is retrieved.

In one embodiment, the mainline cable 825B is retrieved using a cable handler 860, which may be a winch or a power block, a powered reel, pulley or sheave device. During retrieval, the mainline cable 825B is routed across a portion of the workstation 845 of the vessel 805. As the mainline cable 825B passes by the workstation 845, nodes 809 are detached from the cable 825A. In one embodiment, the nodes 809 are detached by personnel on the vessel 805 or suitable mechanical device at or near the workstation 845. After the nodes 809 are detached, the nodes 809 are stowed in a storage device and serviced, if necessary. In one embodiment, the nodes 809 are routed to a storage device where data is collected, batteries are charged, and general servicing, such as quality control and/or the maintenance may be performed.

While the foregoing is directed to embodiments of the invention, other and further embodiments of the invention may be devised without departing from the basic scope thereof, and the scope thereof is determined by the claims that follow.

What is claimed is:

1. A method for performing a seismic survey in a water column, the method comprising:

providing a length of flexible cable from a cable storage device disposed on a vessel to a cable handling device adjacent the cable storage device; wherein the flexible cable comprises a plurality of discrete cable segments coupled by a connector that prevents transmission of power and data signals between adjacent cable segments and a specific gravity that is greater than a specific gravity of water in the water column;

routing the flexible cable to pass adjacent a workstation disposed on the vessel;

deploying a free end of the flexible cable into the water column;

attaching at least one of a plurality of seismic sensor units to the cable as the cable passes the workstation; and controlling a motion of the vessel and a rotational speed of the cable handling device to allow the flexible cable to rest on the bottom of the water column.

2. The method of claim 1, wherein each cable segment comprises:

an inner jacket defining a hollow core;

a metallic material disposed within the hollow core;

a braided fiber surrounding the inner jacket; and an outer jacket circumferentially surrounding the braided fiber.

3. The method of claim 1, further comprising:

attaching a tether between the connector and the at least one seismic sensor unit.

4. A method for performing a seismic survey in a water column, the method comprising:

providing a first cable segment and a second cable segment comprising a flexible cable from a cable handling device disposed on a vessel, wherein the first cable segment and the second cable segment are coupled by a connector that prevents transmission of power and data signals between the first cable segment and the second cable segment;

routing the flexible cable to pass adjacent a workstation disposed on the vessel;

deploying a free end of the flexible cable into the water column;

attaching at least one of a plurality of seismic sensor units to the cable as the cable passes the workstation; and controlling a motion of the vessel and a rotational speed of the cable handling device to allow the flexible cable to rest on the bottom of the water column.

5. The method of claim 4, wherein each of the first cable segment and the second cable segment comprises a specific gravity that is greater than a specific gravity of water in the water column.

6. The method of claim 4, further comprising:

retrieving the flexible cable from the water column.

7. The method of claim 4, wherein the flexible cable is retrieved over a bow of the vessel.

8. The method of claim 7, wherein the vessel is moved toward the free end of the flexible cable during the retrieving.

9. The method of claim 4, wherein the flexible cable is retrieved over a stern of the vessel.

10. The method of claim 9, wherein the vessel is moved toward the free end of the flexible cable during the retrieving.

11. A method for performing a seismic survey in a water column, the method comprising:

providing a first cable segment and a second cable segment comprising a flexible cable from a cable handling device disposed on a vessel, wherein the first cable segment and the second cable segment are coupled by a connector that prevents transmission of power and data signals between the first cable segment and the second cable segment and the flexible cable has a specific gravity that is greater than a specific gravity of water in the water column;

routing the flexible cable to pass adjacent a workstation disposed on the vessel;

deploying a free end of the flexible cable into the water column;

attaching at least one of a plurality of seismic sensor units to the cable as the cable passes the workstation; and controlling a motion of the vessel and a rotational speed of the cable handling device to allow the flexible cable to rest on the bottom of the water column.

12. The method of claim 11, further comprising:

retrieving the flexible cable from the water column.

13. The method of claim 12, wherein the flexible cable is retrieved over a bow of the vessel.

14. The method of claim 12, wherein the flexible cable is retrieved over a stern of the vessel.

* * * * *